United States Patent
Kitagawa

(10) Patent No.: US 10,466,110 B2
(45) Date of Patent: Nov. 5, 2019

(54) INFRARED IMAGE ACQUISITION DEVICE AND INFRARED IMAGE ACQUISITION METHOD

(71) Applicant: FUJIFILM Corporation, Tokyo (JP)

(72) Inventor: Junya Kitagawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 145 days.

(21) Appl. No.: 15/452,937

(22) Filed: Mar. 8, 2017

(65) Prior Publication Data

US 2017/0176258 A1    Jun. 22, 2017

Related U.S. Application Data

(63) Continuation of application No. PCT/JP2015/077343, filed on Sep. 28, 2015.

(30) Foreign Application Priority Data

Sep. 29, 2014 (JP) .................... 2014-199344

(51) Int. Cl.
*H04N 5/359* (2011.01)
*G01J 5/06* (2006.01)
(Continued)

(52) U.S. Cl.
CPC . *G01J 5/06* (2013.01); *G01J 1/42* (2013.01); *G01J 5/0275* (2013.01); *G01J 5/10* (2013.01);
(Continued)

(58) Field of Classification Search
CPC .................. H04N 13/02; H04N 9/09
See application file for complete search history.

(56) References Cited

U.S. PATENT DOCUMENTS

2012/0188344 A1* 7/2012 Imai ............... H04N 5/232
                                                     348/47
2012/0249799 A1   10/2012 Shibata

FOREIGN PATENT DOCUMENTS

CN    102739938 A    10/2012
JP    2010-194073 A   9/2010

OTHER PUBLICATIONS

English Translation of the International Preliminary Report on Patentability and Written Opinion dated Dec. 15, 2015 in PCT/JP2015/077343 filed Sep. 28, 2015.
(Continued)

*Primary Examiner* — Anand S Rao
(74) *Attorney, Agent, or Firm* — Birch, Stewart, Kolasch & Birch, LLP

(57) ABSTRACT

Disclosed is an infrared image acquisition device capable of preventing a glare on a subject and acquiring an infrared image suitable for calculating the temperature of the subject. An infrared image acquisition device includes an infrared imaging unit, a corresponding area detection unit, a glare area detection unit, and an image correction unit. The infrared imaging unit acquires a first image and a second image having different imaging directions with respect to the subject. The corresponding area detection unit detects a first corresponding area and a second corresponding area corresponding to the subject in the first image and the second image. The glare area detection unit detects a first glare area where the first image has a larger amount of infrared rays than that of the second image, and a second glare area. The image correction unit corrects the first glare area based on the second glare area.

11 Claims, 18 Drawing Sheets

(51) Int. Cl.
*G01J 1/42* (2006.01)
*G01J 5/48* (2006.01)
*H04N 5/33* (2006.01)
*H04N 5/357* (2011.01)
*G01J 5/10* (2006.01)
*H04N 5/217* (2011.01)
*H04N 5/243* (2006.01)
*G01J 5/02* (2006.01)
*G01J 5/00* (2006.01)

(52) U.S. Cl.
CPC .............. *G01J 5/48* (2013.01); *H04N 5/2173* (2013.01); *H04N 5/243* (2013.01); *H04N 5/33* (2013.01); *H04N 5/357* (2013.01); *H04N 5/359* (2013.01); *G01J 2005/0048* (2013.01); *G01J 2005/0077* (2013.01)

(56) References Cited

OTHER PUBLICATIONS

International Search Report (PCT/ISA/210) issued in PCT/JP2015/077343, dated Dec. 15, 2015.
Written Opinion (PCT/ISA/237) issued in PCT/JP2015/077343, dated Dec. 15, 2015.
Chinese Office Action and Search Report for Chinese Application No. 201580052707.X, dated Sep. 6, 2018, with an English translation of the Office Action.
Zhao et al., "Multi-vision detection method based on parallel lighting," Infrared and Laser Engineering, vol. 39, No. 2, Apr. 2010, pp. 339-345, with English abstract.

* cited by examiner

INFRARED IMAGE ACQUISITION DEVICE AND INFRARED IMAGE ACQUISITION METHOD

CROSS-REFERENCE TO RELATED APPLICATION

This application is a Continuation of PCT International Application PCT/JP2015/077343 filed on 28 Sep. 2015, which claims priority under 35 USC 119(a) from Japanese Patent Application No. 2014-199344 filed on 29 Sep. 2014. The above application is hereby expressly incorporated by reference, in its entirety, into the present application.

BACKGROUND OF THE INVENTION

1. Field of the Invention

The present invention relates to an infrared image acquisition device and an infrared image acquisition method which acquire temperature information of a subject.

2. Description of the Related Art

An infrared image acquisition device, called infrared thermography, which captures an image of an infrared ray emitted from a subject, converts the captured infrared image to the temperature, and displays the temperature is known (for example, see JP 2010-194073 A). Since the amount of infrared rays depends on the temperature of the subject, temperature information of the subject can be acquired from the pixel value of the infrared image.

However, the infrared image acquired by the infrared image acquisition device has a problem in that an infrared image of an object other than the subject to be measured glares thereon. For example, assuming that an image of the subject is captured right in front, the infrared ray emitted from the infrared image acquisition device itself is reflected by the subject, and the infrared image of the infrared image acquisition device glares on the infrared image.

In order to prevent this problem, even assuming that an image of the subject is captured in a diagonal direction, an infrared image of an infrared ray emitted from a heat source other than the subject may glare on the infrared image. In principle, assuming that all heat sources other than the subject are eliminated, there is no glare on the infrared image. However, of heat sources, there are many heat sources which are not movable physically. For this reason, it is not possible to radically prevent the glare by capturing the image of the subject in the diagonal direction.

SUMMARY OF THE INVENTION

An object of the invention is to provide an infrared image acquisition device and an infrared image acquisition method capable of preventing a glare on a subject and acquiring an infrared image suitable for calculating the temperature of the subject.

An infrared image acquisition device of the invention comprises an infrared imaging unit, a corresponding area detection unit, a glare area detection unit, and an image correction unit. The infrared imaging unit acquires a first image and a second image having different imaging directions with respect to a subject. The corresponding area detection unit detects areas corresponding to the subject in the first image and the second image as corresponding areas. The glare area detection unit compares the first image and the second image in the corresponding areas and detects, as a glare area, an area where the first image has a larger amount of infrared rays than that of the second image. The image correction unit corrects the glare area in the first image based on a glare area in the second image.

It is preferable that the infrared imaging unit captures the first image and the second image under the same imaging exposure conditions.

It is preferable that the image correction unit substitutes the glare area in the first image with the glare area in the second image to correct the first image. Alternatively, it is preferable that the image correction unit calculates the amount of glare in the glare area from the difference in the amount of infrared rays between the first image and the second image and subtracts the amount of glare from the glare area in the first image to correct the first image.

It is preferable that the corresponding area detection unit detects the corresponding areas based on contour information of the first image and the second image. It is preferable that the corresponding area detection unit detects the corresponding areas based on specific areas detected in common from the first image and the second image.

It is preferable that the infrared imaging unit is able to detect an infrared ray in a wavelength range equal to or greater than 8 μm and equal to or less than 14 μm.

It is preferable that the infrared imaging unit comprises a first infrared imager which captures the first image, and a second infrared imager which captures the second image.

It is preferable that the infrared image acquisition device further comprises a display unit which converts the pixel value of the first image corrected by the image correction unit to temperature information and displays the temperature information.

An infrared image acquisition method of the invention comprises a first image acquisition step, a second image acquisition step, a corresponding area detection step, a glare area detection step, and an image correction step. The first image acquisition step is a step of acquiring a first image of a subject using an infrared imaging unit. The second image acquisition step is a step of acquiring a second image having a different imaging direction from the first image with respect to the subject using the infrared imaging unit. The corresponding area detection step is a step of detecting areas corresponding to the subject in the first image and the second image as corresponding areas. The glare area detection step is a step of comparing the first image and the second image in the corresponding areas and detecting, as a glare area, an area where the first image has a larger amount of infrared rays than that of the second image. The image correction step is a step of correcting the glare area in the first image based on a glare area in the second image.

It is preferable that the infrared imaging unit comprises a first infrared imager and a second infrared imager, and the first image acquisition step and the second image acquisition step are performed simultaneously using the first infrared imager and the second infrared imager respectively.

According to the invention, since two images are captured in different imaging directions with respect to a subject, the two images are compared to detect a glare area, and an image is corrected, it is possible to prevent a glare on the subject and acquire an infrared image suitable for calculating the temperature of the subject.

DESCRIPTION OF THE PREFERRED EMBODIMENTS

[First Embodiment]

Figure 1:
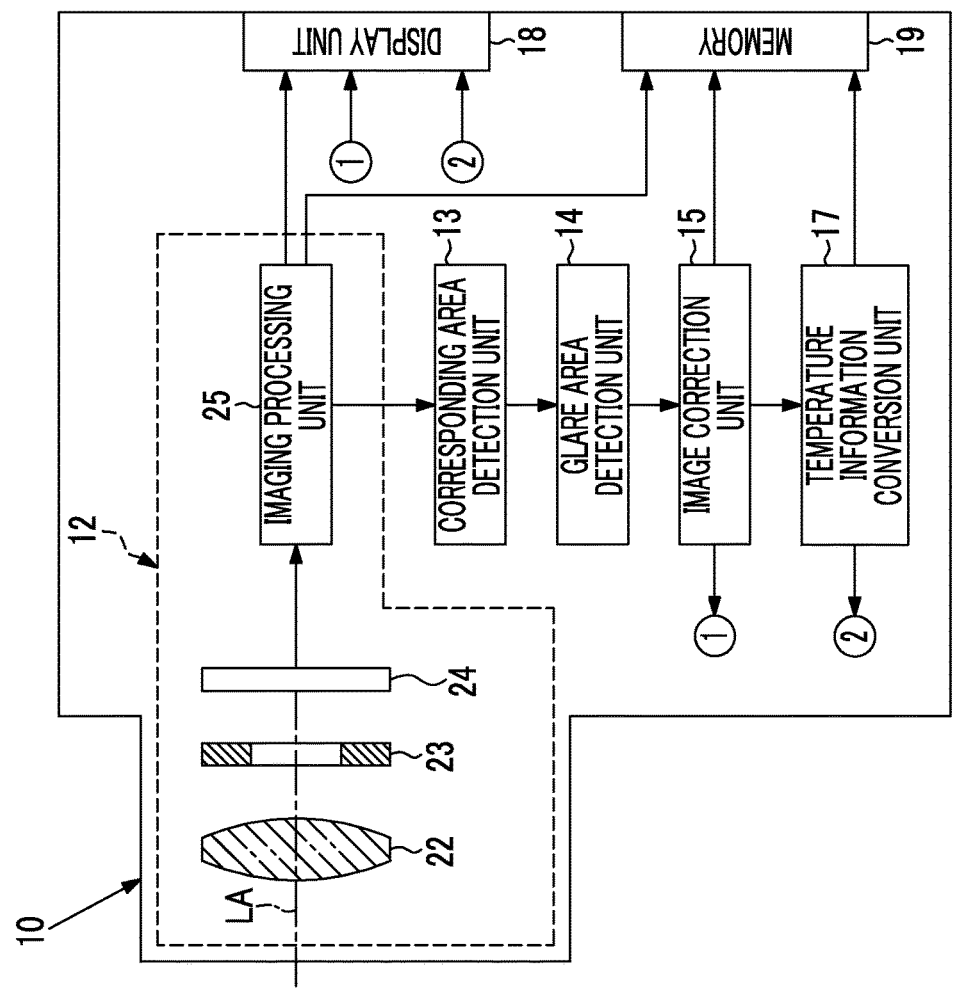
FIG. 1 is a block diagram showing the configuration of an infrared image acquisition device.

In FIG. 1, an infrared image acquisition device 10 is an infrared camera comprising an infrared imaging unit 12, a corresponding area detection unit 13, a glare area detection unit 14, an image correction unit 15, a temperature information conversion unit 17, a display unit 18, and a memory 19. The infrared imaging unit 12 comprises a focus lens 22, a diaphragm 23, an infrared sensor 24, and an imaging processing unit 25.

The infrared imaging unit 12 captures an image of an infrared ray from a subject to acquire an infrared image. The focus lens 22 focuses an optical image of the infrared ray from the subject on the infrared sensor 24. The diaphragm 23 adjusts the amount of infrared rays from the subject. The infrared sensor 24 photoelectrically converts the infrared ray from the subject and outputs an imaging signal to the imaging processing unit 25. The imaging processing unit 25 generates an infrared image from the imaging signal.

The focus lens 22, the diaphragm 23, and the infrared sensor 24 are controlled by a control unit (not shown) such that predetermined focusing conditions and imaging exposure conditions are satisfied.

The infrared sensor 24 can detect infrared ray in a wavelength range equal to or greater than 8 µm and equal to or less than 14 µm, and is capable of control of an electronic shutter speed. For the infrared sensor 24, for example, a quantum type (cooling type) infrared sensor using mercury cadmium telluride (HgCdTe) or germanium-silicon (GeSi), or a thermal type (non-cooling type) infrared sensor using vanadium oxide (VOx), an yttrium-based superconductor (YBCO), or amorphous silicon (a-Si) is used.

Figure 2:
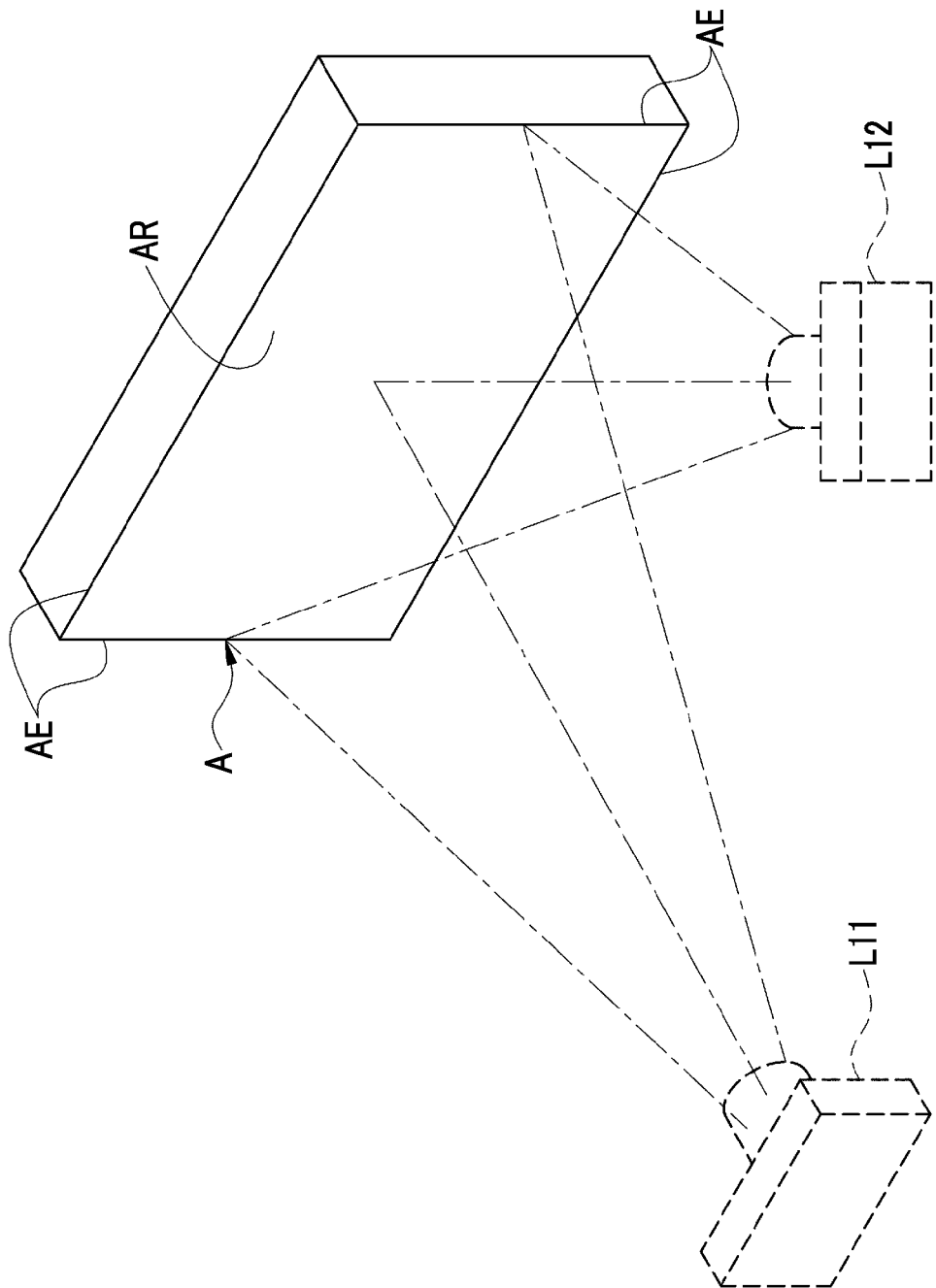
FIG. 2 is an explanatory view illustrating the positional relationship between the infrared image acquisition device and a subject at the time of capturing a first image and a second image.
Figure 3:
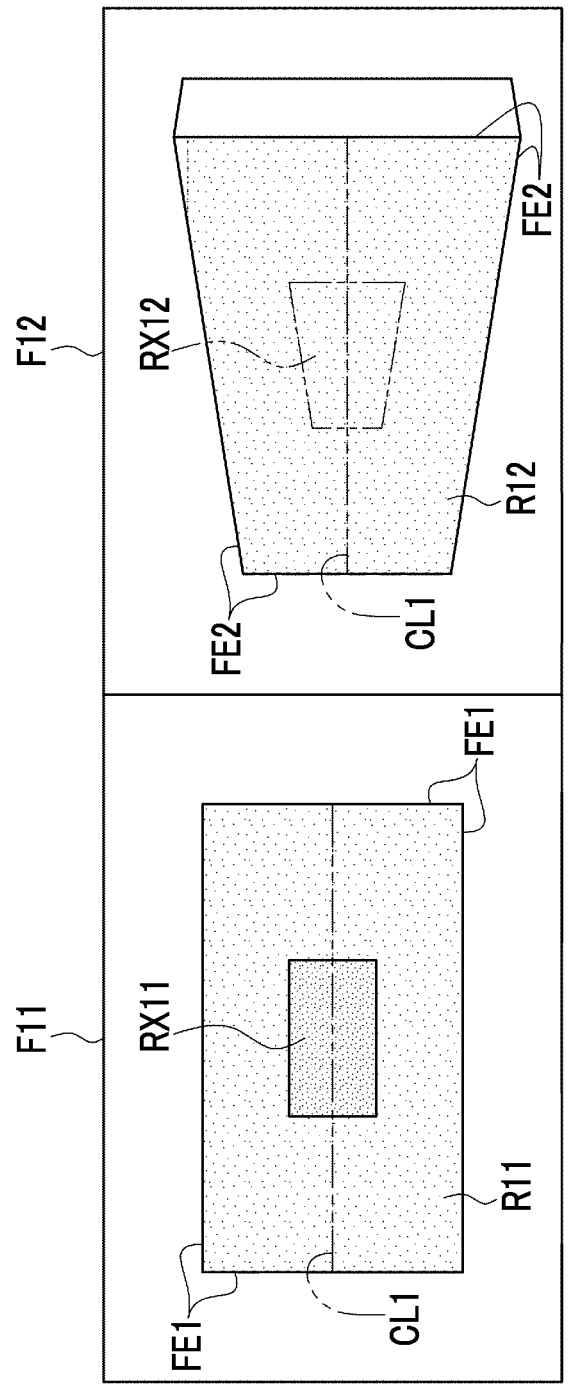
FIG. 3 is a diagram showing the first image and the second image.

The infrared imaging unit 12 acquires two infrared images (for example, in FIG. 3, first image F11 and second image F12). Specifically, the infrared imaging unit 12 captures images at different angles with respect to the subject under the same conditions to acquire the first image F11 and the second image F12. The term "same conditions" means the same imaging exposure conditions. The term "different angles with respect to the subject" means that, in FIG. 2, a direction (imaging direction) to a center portion of an area AR to be captured in a subject A is different at a first position L11 where the first image F11 is captured and at a second position L12 where the second image F12 is captured. That is, the first image F11 and the second image F12 have different imaging directions with respect to the subject A. The angle formed by the first position L11, the center portion of the area AR, and the second position L12 is preferably equal to or greater than 5 degrees, and more preferably, equal to or greater than 10 degrees.

An example where the first image F11 and the second image F12 are captured by the infrared imaging unit 12 will be described referring to FIGS. 2 and 3. In FIG. 2, the first position L11 is a position where an image of the area AR is captured right in front. The second position L12 is a position where an image of the area AR is captured diagonally from the right. The area AR is an area surrounded by a contour AE in the subject A.

In FIG. 3, the first image F11 has first contour information FE1 based on the contour AE, a first corresponding area R11 based on the area AR, and a first glare area RX11 based on an area where the infrared image acquisition device 10 glares on the area AR. The second image F12 shows second contour information FE2 based on the contour AE and a second corresponding area R12 based on the area AR. At the second position L12, since the glare of the infrared image acquisition device 10 on the area AR does not occur, the second image F12 has no glare area.

The corresponding area detection unit 13 detects a corresponding area based on the area AR in the first image F11 as the first corresponding area R11. Specifically, the corresponding area detection unit 13 detects the first corresponding area R11 based on the first contour information FE1 in the first image F11. The corresponding area detection unit 13 detects a corresponding area based on the area AR in the second image F12 as the second corresponding area R12. Specifically, the corresponding area detection unit 13 detects the second corresponding area R12 based on the second contour information FE2 in the second image F12. The corresponding area detection unit 13 correlates all coordinates of the first image F11 and the second image F12 with each other.

Figure 4:
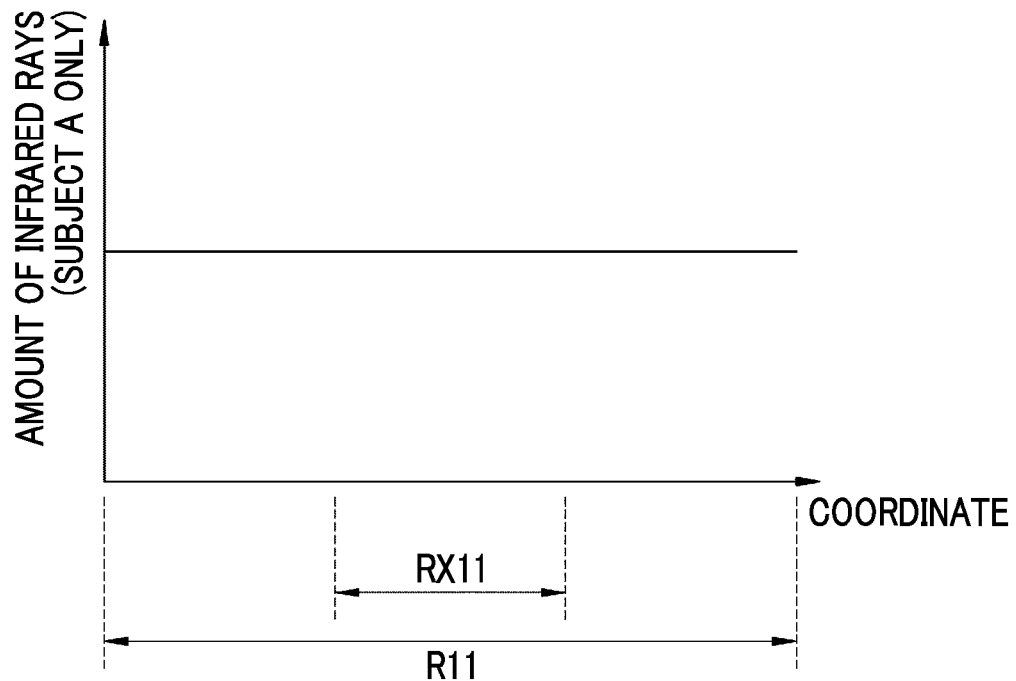
FIG. 4 is a diagram showing the amount of infrared rays on a line segment CL1 from the subject.
Figure 5:
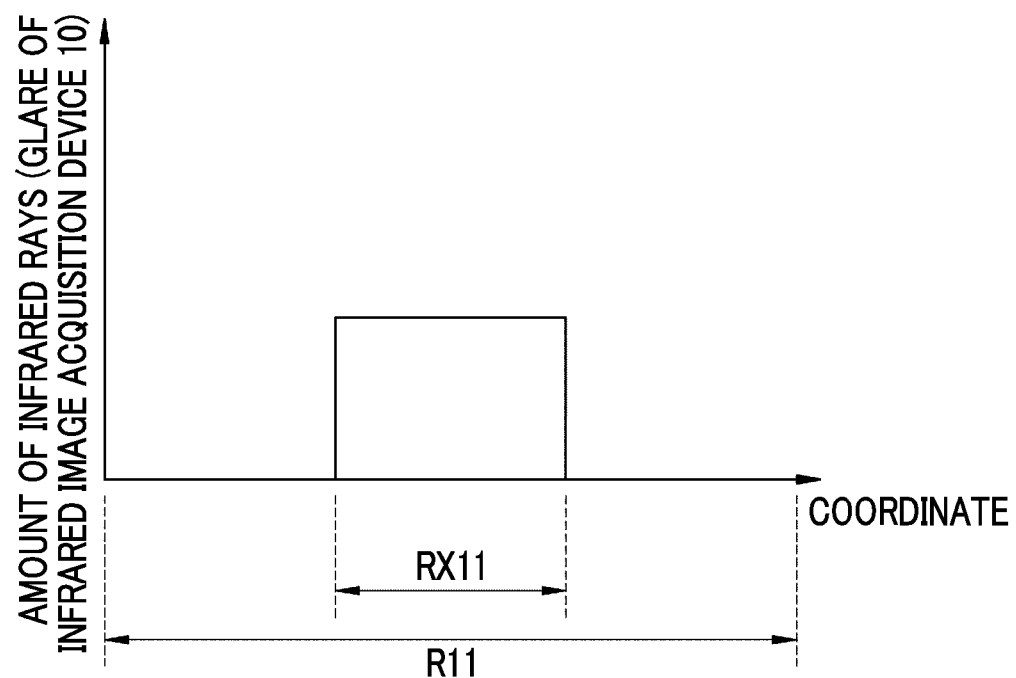
FIG. 5 is a diagram showing the amount of infrared rays on the line segment CL1 due to a glare of the infrared image acquisition device on the subject.
Figure 6:
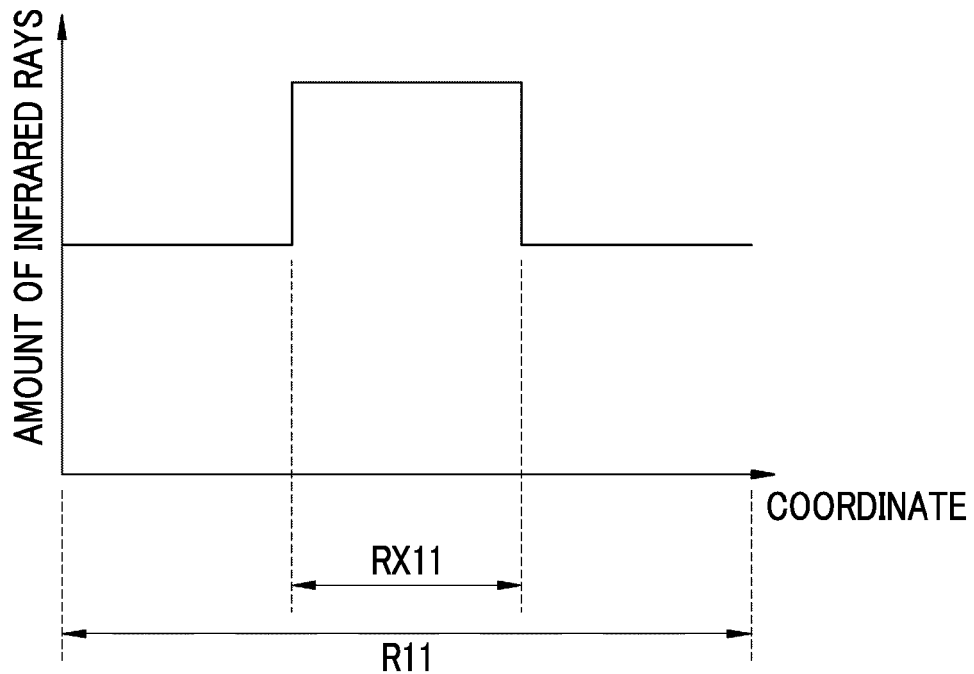
FIG. 6 is a diagram showing the amount of infrared rays on the line segment CL1 of the first image.

The first corresponding area R11 includes information regarding the amount of infrared rays from the area AR and information regarding the amount of infrared rays due to the glare of the infrared image acquisition device 10. In regard to information regarding the amount of infrared rays from the area AR of the subject A, for example, on a line segment CL1 shown in FIG. 3, as shown in FIG. 4, the infrared rays are substantially uniformly distributed and included in the first corresponding area R11. In regard to information regarding the amount of infrared rays due to the glare of the infrared image acquisition device 10 on the subject A, on the line segment CL1, as shown in FIG. 5, the infrared rays are substantially uniformly distributed and included in first glare area RX11. For this reason, as shown in FIG. 6, on the line segment CL1 of the first corresponding area R11, the amount of infrared rays of the first glare area RX11 is larger than the amount of infrared rays around the first glare area RX11.

Figure 7:
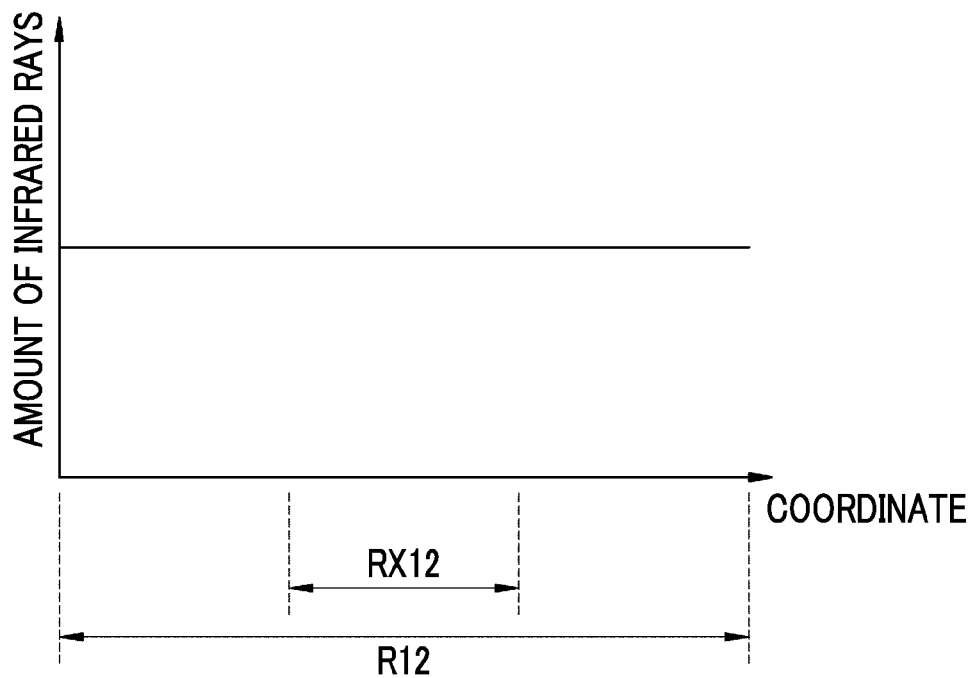
FIG. 7 is a diagram showing the amount of infrared rays on the line segment CL1 of the second image.

The second corresponding area R12 includes only information regarding the amount of infrared rays from the area AR of the subject A. On the line segment CL1 of the second corresponding area R12, as shown in FIG. 7, the amount of infrared rays is substantially uniform in the second corresponding area R12.

The glare area detection unit 14 compares the first corresponding area R11 and the second corresponding area R12 and detects an area in the first corresponding area R11 having a larger amount of infrared rays than that of the second corresponding area R12 as a glare area.

Figure 8:
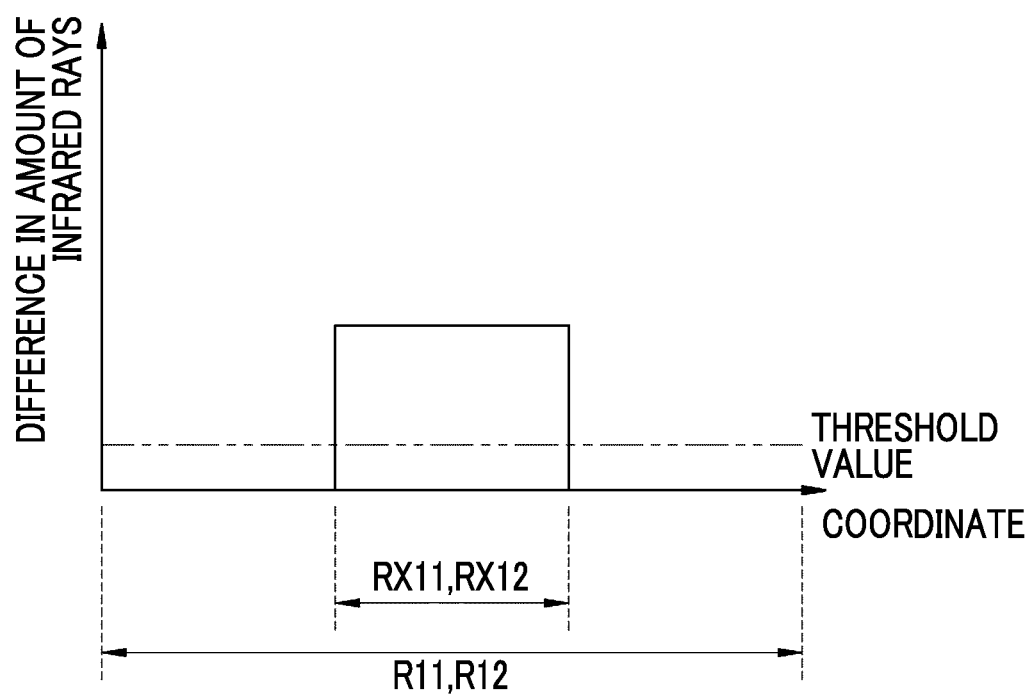
FIG. 8 is a diagram showing a difference in the amount of infrared rays included in the first image and the second image on the line segment CL1.

The glare area detection unit 14 calculates the difference between the amount of infrared rays in the first corresponding area R11 and the amount of infrared rays in the second corresponding area R12. As shown in FIG. 8, the difference in the amount of infrared rays on the line segment CL1 becomes a value equal to or greater than a threshold value in the first glare area RX11 where the infrared image acquisition device 10 glares on the first image F11, and becomes substantially 0 smaller than the threshold value in other areas. The glare area detection unit 14 detects an area of the first image F11 where the difference in the amount of infrared rays is equal to or greater than the threshold value, that is, the first glare area RX11 as a glare area of the first image F11. The glare area detection unit 14 detects an area of the second image F12 corresponding to the first glare area RX11 as a second glare area RX12.

Figure 9:
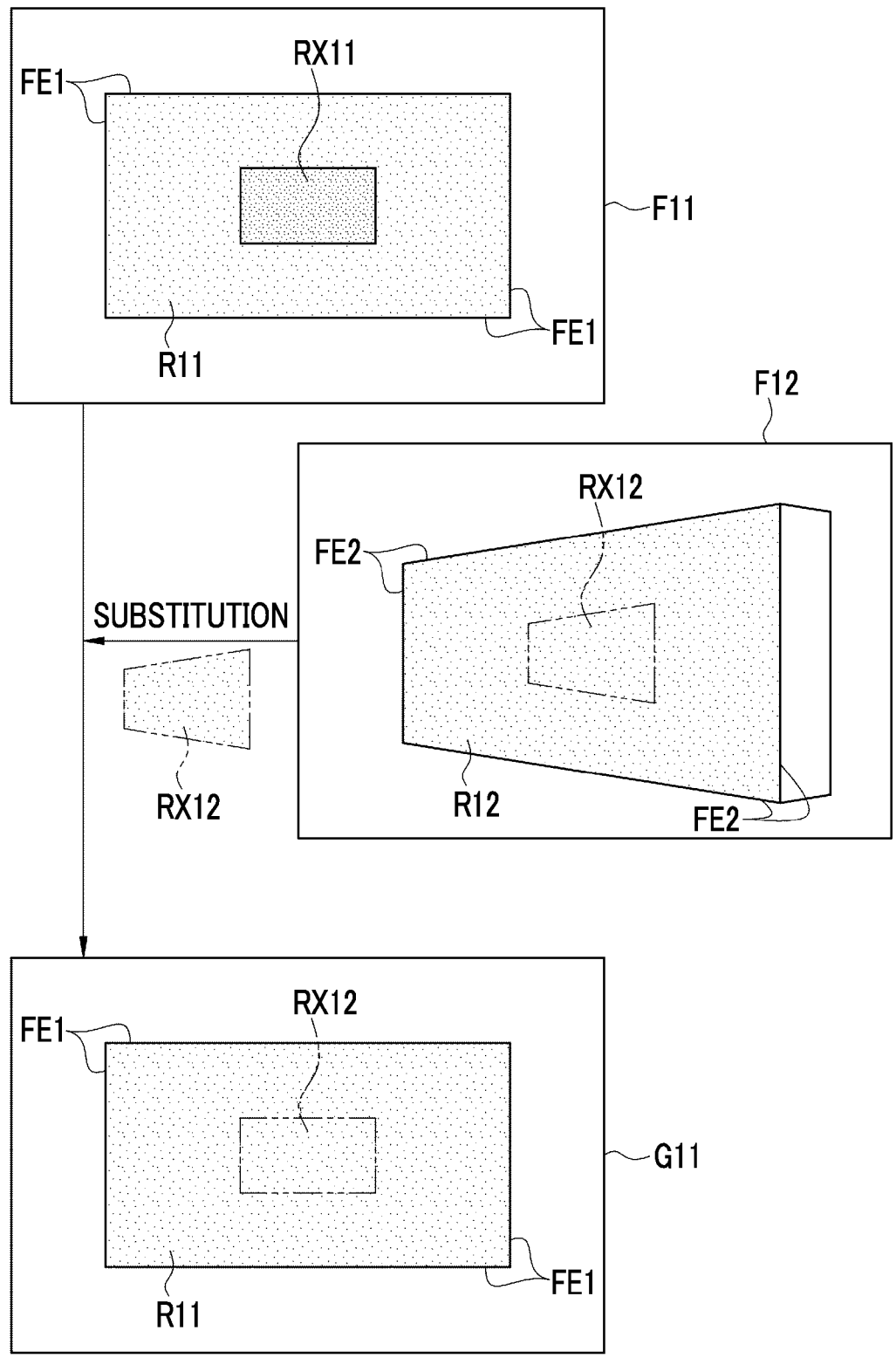
FIG. 9 is an explanatory view illustrating correction of a glare area of the first image.

The image correction unit 15 corrects the first glare area RX11 based on the second glare area RX12. In FIG. 9, the image correction unit 15 substitutes the first glare area RX11 with the second glare area RX12 to acquire a corrected first image G11 with the glare corrected. In the substitution, the second glare area RX12 is converted from the coordinate system of the second image F12 to the coordinate system of the first image F11, and is substituted for the first glare area RX11.

The corrected first image G11 is substantially an image including only information regarding the amount of infrared rays from the area AR of the subject A since the glare is prevented through correction. Accordingly, the corrected first image G11 is an infrared image suitable for calculating the temperature of the subject A.

Figure 10:
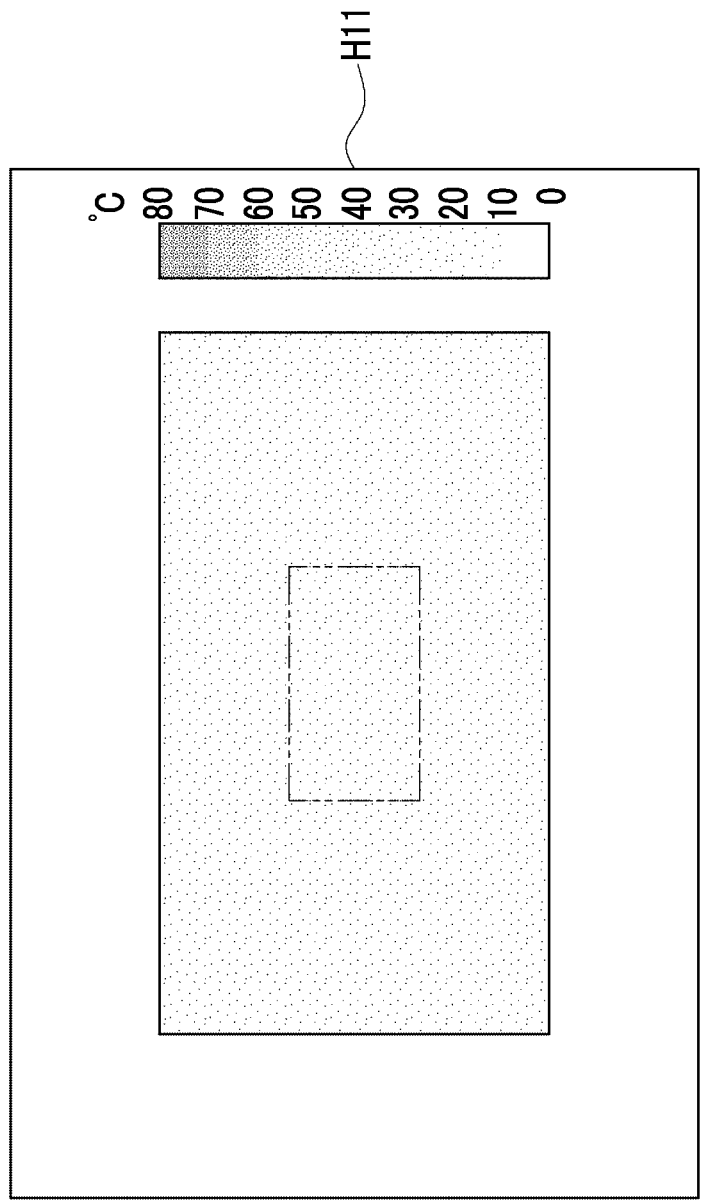
FIG. 10 is a diagram showing a temperature information image obtained from a corrected first image.

The temperature information conversion unit 17 converts the pixel value of the corrected first image G11 to temperature information to acquire a temperature distribution image H11 shown in FIG. 10. The temperature distribution image H11 displays an image based on the pixel value according to the temperature and a gauge indicating the relationship between the temperature and the pixel value after conversion in parallel. The temperature distribution image H11 is, for example, an infrared thermal image.

The display unit 18 can display the first image F11 or the second image F12 acquired by the imaging processing unit 25, the corrected first image G11 acquired by the image correction unit 15, and the temperature distribution image H11 acquired by the temperature information conversion unit 17 respectively.

The memory 19 can store the first image F11 or the second image F12 acquired by the imaging processing unit 25, the corrected first image G11 acquired by the image correction unit 15, and the temperature distribution image H11 acquired by the temperature information conversion unit 17 respectively.

Figure 11:
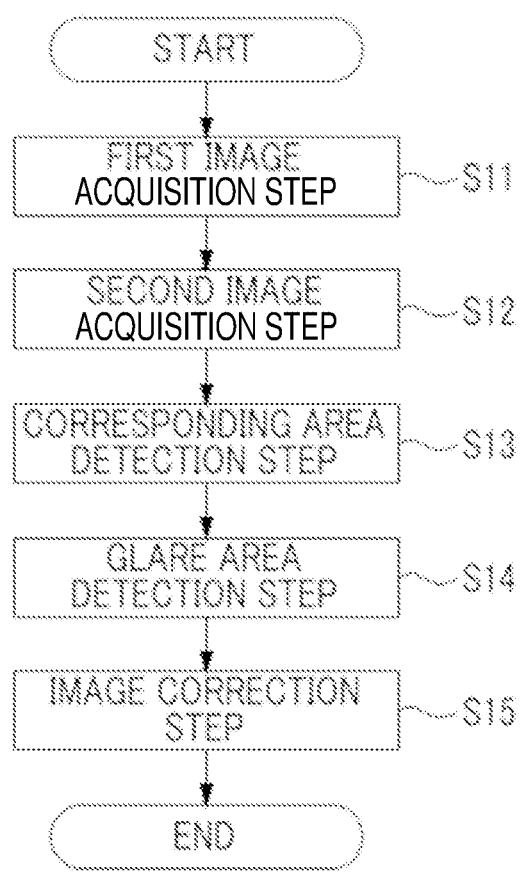
FIG. 11 is a flowchart for acquiring an infrared image suitable for calculating the temperature of the subject.

A method of acquiring the corrected first image G11 using the infrared image acquisition device 10 will be described referring to the flowchart shown in FIG. 11.

The infrared image acquisition device 10 is arranged at the first position L11 (see FIG. 2) and performs an imaging operation toward the area AR of the subject A with the infrared imaging unit 12 to acquire the first image F11 (see FIG. 3) (first image acquisition step S11). The infrared image acquisition device 10 is arranged at the second position L12 (see FIG. 2) and performs an imaging operation toward the area AR of the subject A with the infrared imaging unit 12 to acquire the second image F12 (see FIG. 3) (second image acquisition step S12).

Figure 12:
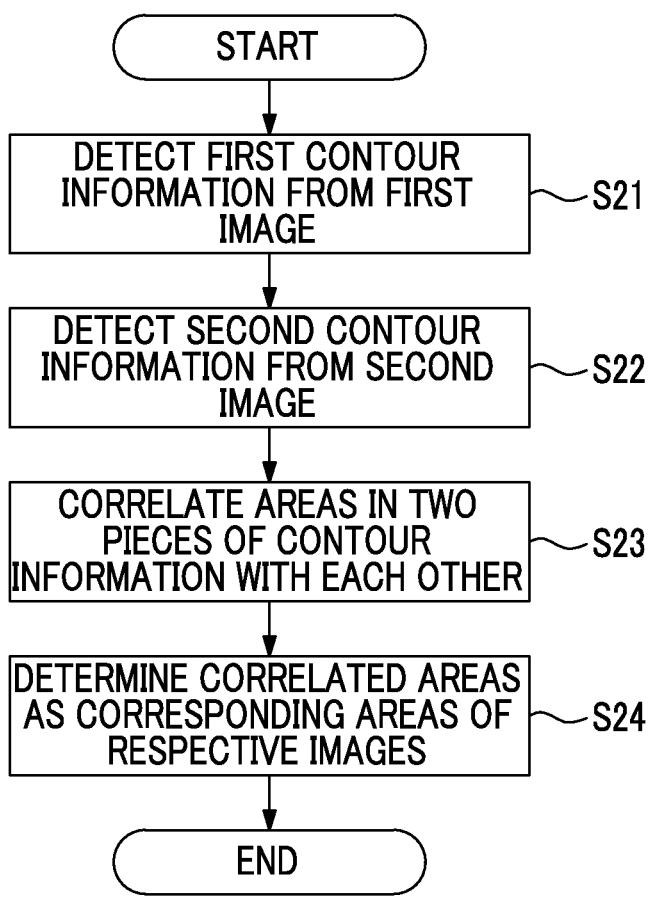
FIG. 12 is a flowchart for detecting corresponding areas.

A corresponding area detection step S13 will be described referring to the flowchart shown in FIG. 12. The corresponding area detection step S13 has Steps S21 to S24. The corresponding area detection unit 13 receives the supply of the first image F11 and the second image F12 from the imaging processing unit 25 of the infrared imaging unit 12. The corresponding area detection unit 13 detects the first contour information FE1 corresponding to the area AR in the first image F11 (Step S21). Next, the corresponding area detection unit 13 detects the second contour information FE2 corresponding to the area AR in the second image F12 (Step S22).

The corresponding area detection unit 13 correlates an area inside the first contour information FE1 in the first image F11 with an area inside the second contour information FE2 in the second image F12 (Step S23). The respective areas correlated between the respective images are respectively detected as the first corresponding area R11 and the second corresponding area R12 (Step S24).

Figure 13:
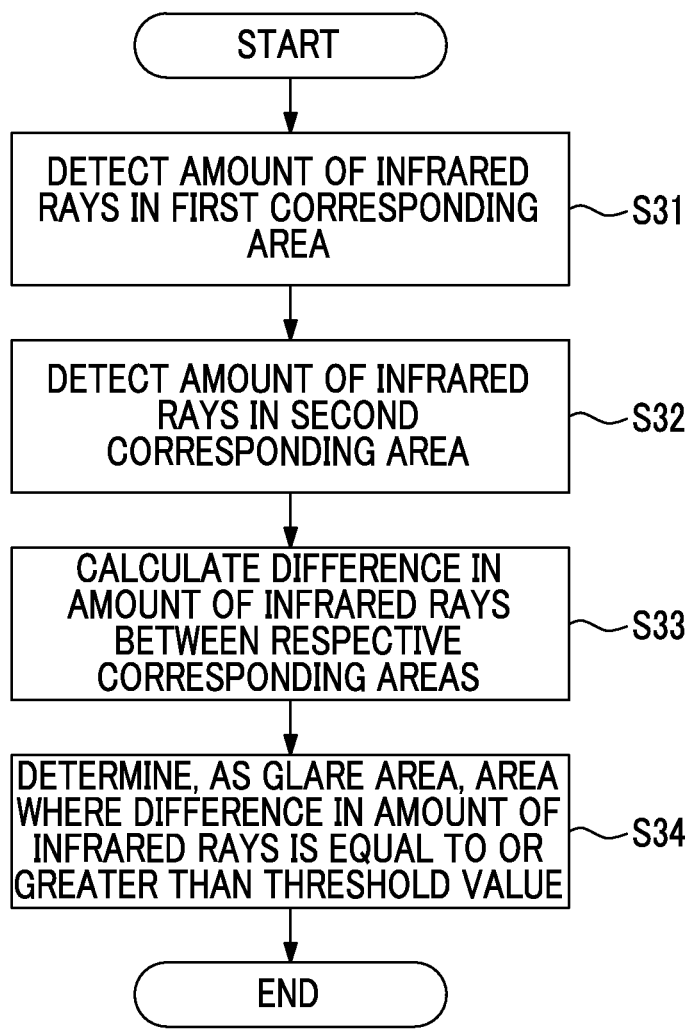
FIG. 13 is a flowchart for detecting glare areas.

A glare area detection step S14 will be described referring to the flowchart shown in FIG. 13. The glare area detection step S14 has Steps S31 to S34. The glare area detection unit 14 detects the amount of infrared rays inside the first corresponding area R11 in the first image F11 (Step S31). Next, the glare area detection unit 14 detects the amount of infrared rays inside the second corresponding area R12 in the second image F12 (Step S32).

The glare area detection unit 14 calculates the difference in the amount of infrared rays between the first corresponding area R11 and the second corresponding area R12 (Step S33). Then, the glare area detection unit 14 detects, as a glare area, an area where the difference in the amount of infrared rays equal to or greater than the threshold value (Step S34). Specifically, the glare area detection unit 14 detects, as the first glare area RX11, an area of the first image F11 where the difference in the amount of infrared rays is equal to or greater than the threshold value. The glare area detection unit 14 detects an area of the second image F12 corresponding to the first glare area RX11 as the second glare area RX12.

The image correction unit 15 substitutes the first glare area RX11 with the second glare area RX12 to correct the glare (image correction step S15). With this, the image correction unit 15 acquires the corrected first image G11.

As described above, the infrared image acquisition device 10 corrects the glare using the images captured at different angles with respect to the area AR of the subject A under the same conditions, thereby acquiring the corrected first image G11 which is an infrared image suitable for calculating the temperature of the subject A. The temperature distribution image H11 is obtained from the corrected first image G11 by the temperature information conversion unit 17.

In this example, the arrangement of the infrared image acquisition device 10 at the first position L11 and the second position L12 may be performed by an operator or may be performed by a moving unit (not shown) provided in the infrared image acquisition device 10.

In this example, although all of Steps S11 and S12 of capturing the first image F11 and the second image F12 and Steps S13 to S15 of correcting the glare of the acquired first image F11 are performed in the infrared image acquisition device 10, Steps S11 and S12 and Steps S13 to S15 may be performed by different devices. That is, the first image F11 and the second image F12 may be extracted from a device which performs Steps S11 and S12, the first image F11 and the second image F12 may be input to another device, and Steps S13 to S15 may be performed.

In this example, the infrared sensor is not limited to the above-described infrared sensor 24, and any known infrared sensors may be used.

Another example of a method of acquiring a corrected first image G21 using the infrared image acquisition device 10 will be described. For example, a method of acquiring the corrected first image G21 using the infrared image acquisition device 10 in a case of acquiring temperature information of a portion of a device in a factory or the like will be described referring to FIGS. 14 to 20. The same configurations as those in the above-described example of the first embodiment are represented by the same reference numerals, and detailed description thereof will not be repeated.

Figure 14:
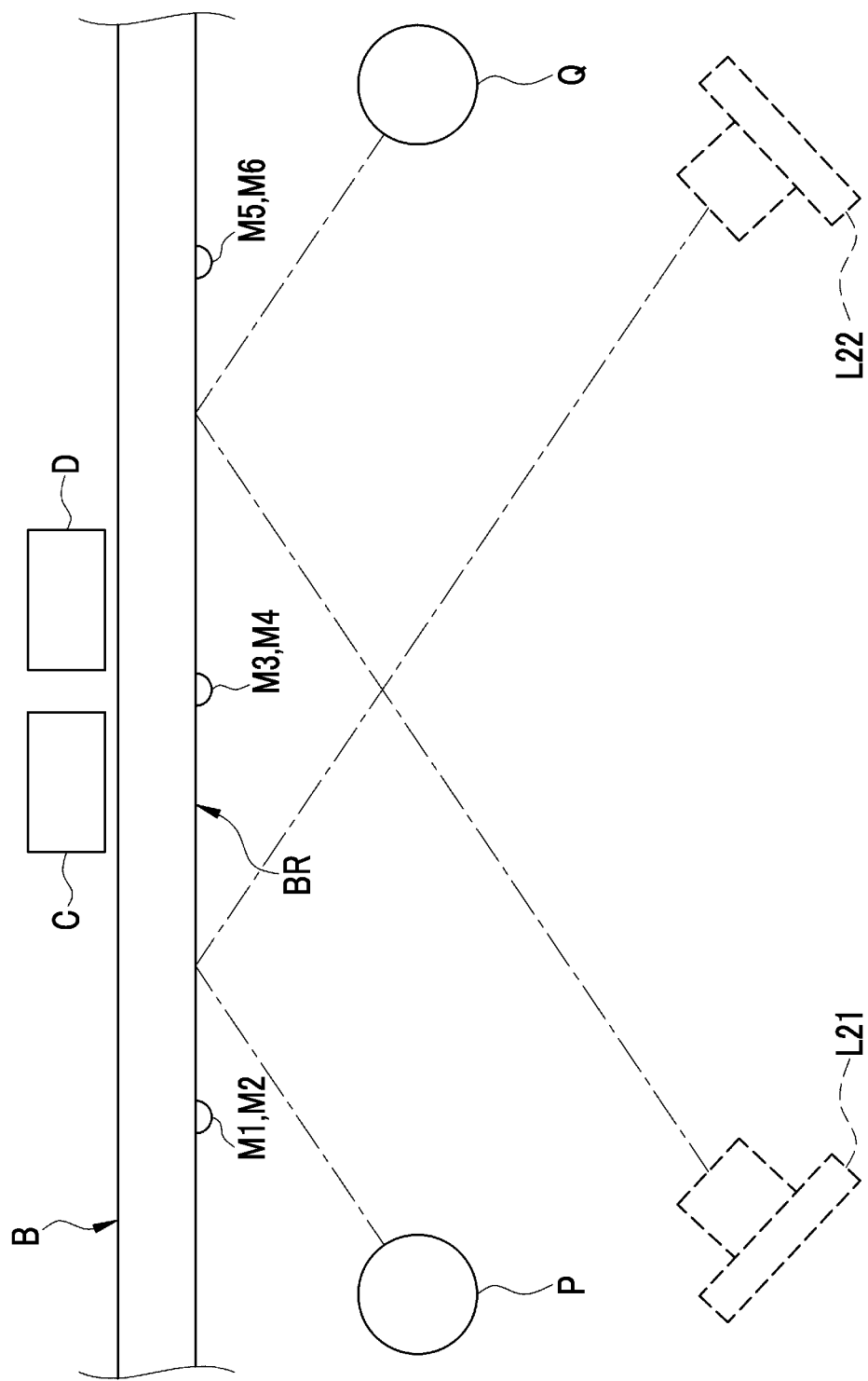
FIG. 14 is an explanatory view illustrating another aspect of the positional relationship between the infrared image acquisition device and the subject at the time of capturing the first image and the second image.

A first image F21 and a second image F22 (see FIG. 15) are captured at different angles with respect to the subject from the same side under the same conditions by the infrared imaging unit 12. In FIG. 14, a first position L21 is a position where an image of an area BR on an imaging side designated by specific areas M1 to M6 in a subject B is captured diagonally from the left. A second position L22 is a position where an image of the area BR is captured diagonally from the right. The specific area M1 is positioned at an upper left end of the area BR while viewed from the imaging side. The specific area M2 is positioned at a lower left end of the area BR while viewed from the imaging side. The specific area M3 is positioned at a central upper end of the area BR while viewed from the imaging side. The specific area M4 is positioned at a central lower end of the area BR while viewed from the imaging side. The specific area M5 is positioned at an upper right end of the area BR while viewed from the imaging side. The specific area M6 is positioned at a lower right end of the area BR while viewed from the imaging side.

For example, it is assumed that a cooler C and a heater D which can change the temperature of the subject B on a side opposite to the imaging side with respect to the subject B. The cooler C and the heater D are not visible from the imaging side. The cooler C is arranged on the left side of the specific areas M3 and M4 while viewed from the imaging side. The heater D is arranged on the right side of the specific areas M3 and M4 while viewed from the imaging side. A certain portion of the area BR in the subject B is cooled by the cooler C, and another portion is heated by the heater D.

For example, it is assumed that there is a high-temperature pillar P as a heat source other than the subject in a space on the left side of the specific areas M1 and M2 on the imaging side with respect to the subject B and there is a low-temperature pillar Q as a heat source other than the subject in a space on the left side of the specific areas M5 and M6 on the imaging side with respect to the subject B. The pillar P and the pillar Q are fixed and are not movable physically. For this reason, it is not possible to prevent glares of infrared images of the pillar P and the pillar Q on the infrared images by changing the imaging direction of the subject B.

Figure 15:
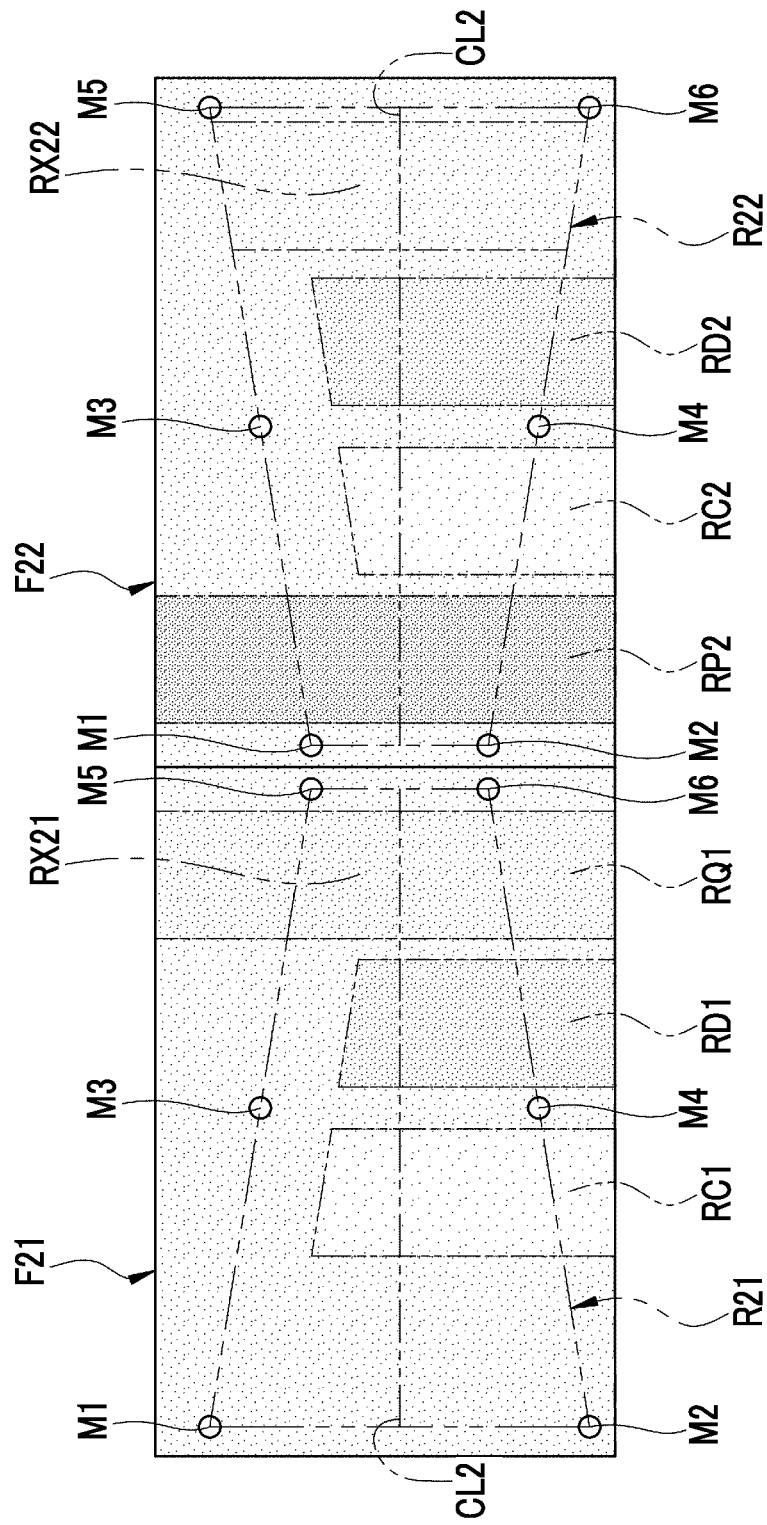
FIG. 15 is a diagram showing a first image and a second image in another aspect.

In FIG. 15, the first image F21 shows the specific areas M1 to M6, a first corresponding area R21, an area RC1, an area RD1, and an area RQ1. The first corresponding area R21 is an area surrounded by the specific areas M1 to M6. The area RC1 is an area cooled by the cooler C. The area RD1 is an area heated by the heater D. The area RQ1 is an area where the pillar Q glares on the area BR. Since the glare of the pillar Q on the area BR is not viewed at the first position L21, there is no glare of the pillar P on the first image F21.

The second image F22 shows the specific areas M1 to M6, a second corresponding area R22, an area RC2, an area RD2, and an area RP2. The second corresponding area R22 is an area surrounded by the specific areas M1 to M6. The area RC2 is an area cooled by the cooler C. The area RD2 is an area heated by the heater D. The area RP2 is an area where the pillar P glares on the area BR. Since the glare of the pillar P on the area BR is not viewed at the second position L22, there is no glare of the pillar Q on the second image F22.

The corresponding area detection unit 13 detects the first corresponding area R21 as a corresponding area in the first image F21. The corresponding area detection unit 13 detects the second corresponding area R22 as a corresponding area in the second image F22. As described above, the first corresponding area R21 and the second corresponding area R22 are areas surrounded by the specific areas M1 to M6 detected in common from the first image F21 and the second image F22. As in the above-described example of the first embodiment, the corresponding area detection unit 13 correlates all coordinates of the first image F21 and the second image F22 with each other.

Figure 16:
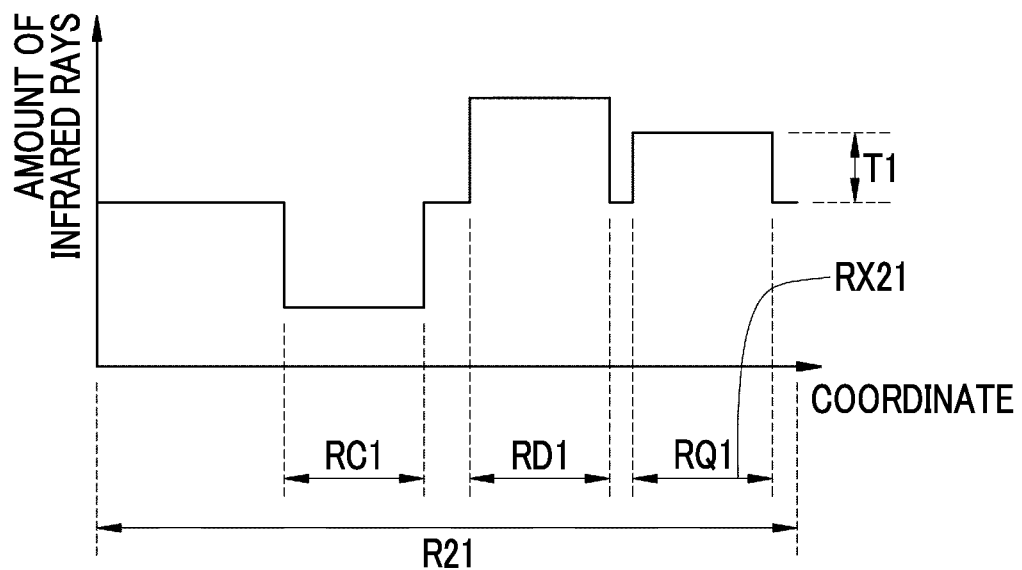
FIG. 16 is a diagram showing the amount of infrared rays included in the first image in another aspect.

The first corresponding area R21 includes information regarding the amount of infrared rays from the area BR and information regarding the amount of infrared rays due to the glare of the pillar Q. Since the area BR has a temperature distribution due to the cooler C and the heater D, the amount of infrared rays from the area BR has a distribution. On a line segment CL2 of the first corresponding area R21 shown in FIG. 15, as shown in FIG. 16, the amount of infrared rays of the area RC1 is smaller than that around the area RC1, the amount of infrared rays of the area RD1 is larger than that around the area RD1, and the amount of infrared rays of the area RQ1 is larger than that around the area RQ1 by T1. T1 is the amount of glare of the pillar Q on the area RQ1.

Figure 17:
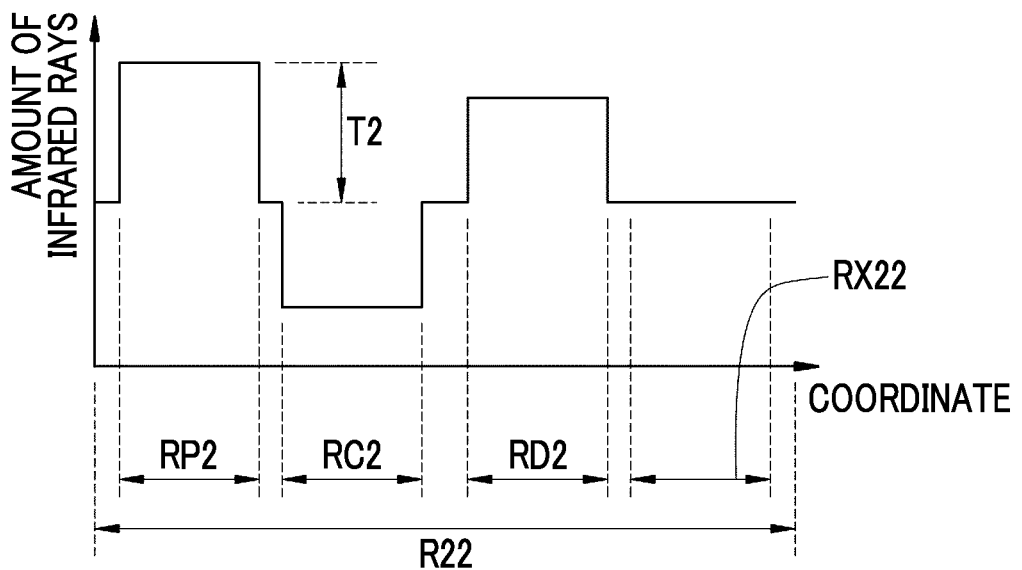
FIG. 17 is a diagram showing the amount of infrared rays included in the second image in another aspect.

The second corresponding area R22 includes information regarding the amount of infrared rays from the area BR and information regarding the amount of infrared rays due to the glare of the pillar P. On a line segment CL2 of the second corresponding area R22 shown in FIG. 15, as shown in FIG. 17, the amount of infrared rays of the area RC2 is smaller than that around the area RC2, the amount of infrared rays of the area RD2 is larger than that around the area RD2, and the amount of infrared rays of the area RP2 is larger than that around the area RP2 by T2. T2 is the amount of glare of the pillar P on the area RP2.

As in the above-described example of the first embodiment, the glare area detection unit 14 detects a glare area. In this example, the glare area detection unit 14 detects, as a first glare area RX21 in the first image F21, an area where the first corresponding area R21 and the area RQ1 overlap each other. The glare area detection unit 14 detects an area of the second image F22 corresponding to the first glare area RX21 as a second glare area RX22.

Figure 18:
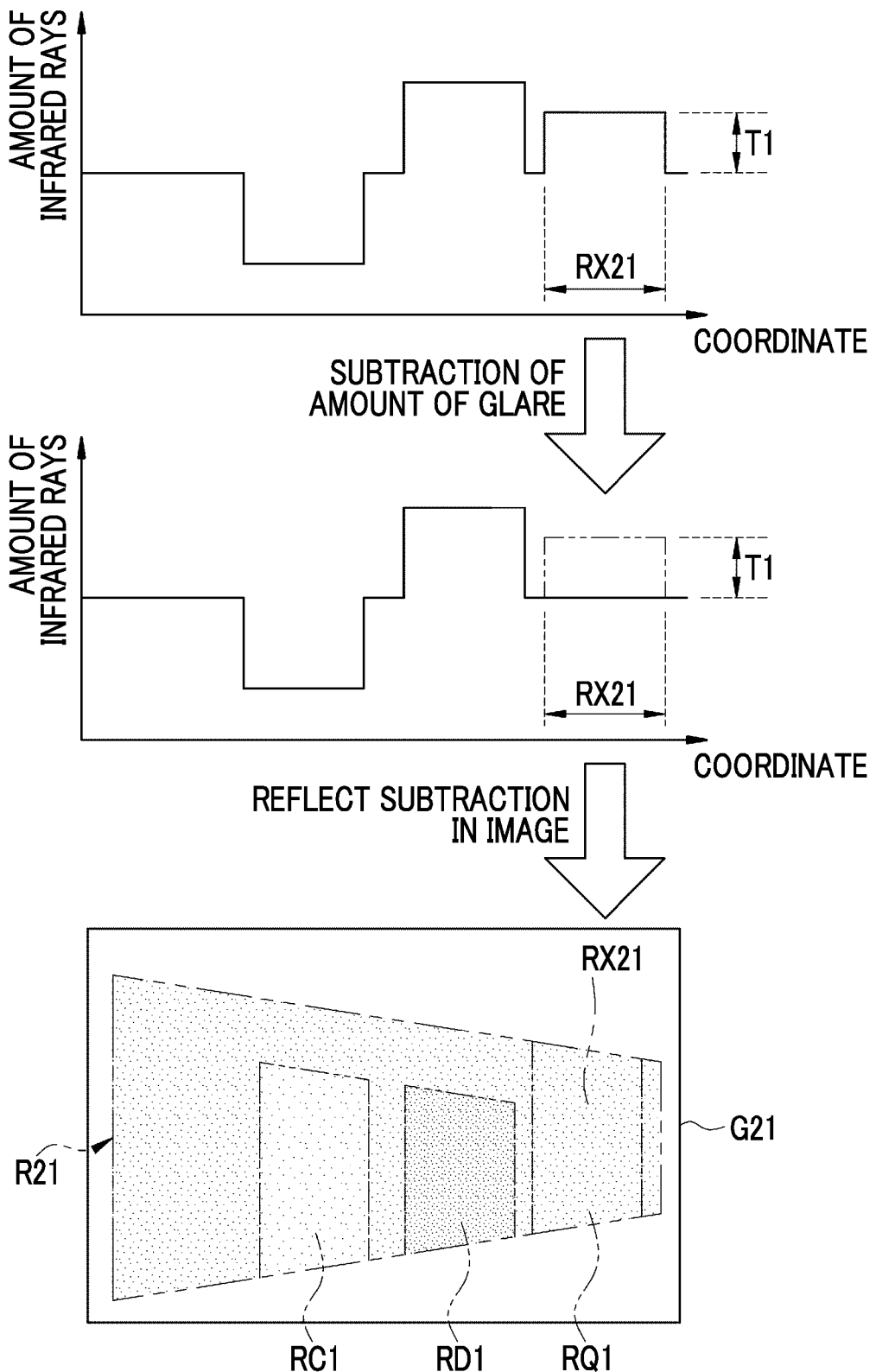
FIG. 18 is an explanatory view illustrating another aspect of correction of a glare area of the first image.

The image correction unit 15 corrects the glare of the first image F21 as follows, instead of the correction in the above-described example of the first embodiment. The image correction unit 15 calculates the amount T1 of glare from the difference between the amount of infrared rays of the first glare area RX21 and the amount of infrared rays of the second glare area RX22. In FIG. 18, the image correction unit 15 subtracts the amount T1 of glare from the amount of infrared rays in the first glare area RX21. The image correction unit 15 reflects (takes into consideration) the subtraction processing in the first corresponding area R21 of the first image F21 to acquire the corrected first image G21 with the glare corrected.

The corrected first image G21 is substantially an image including only information regarding the amount of infrared rays from the area BR of the subject B since the glare is prevented through correction. Accordingly, the corrected first image G21 is an infrared image suitable for calculating the temperature of the subject B.

Figure 19:
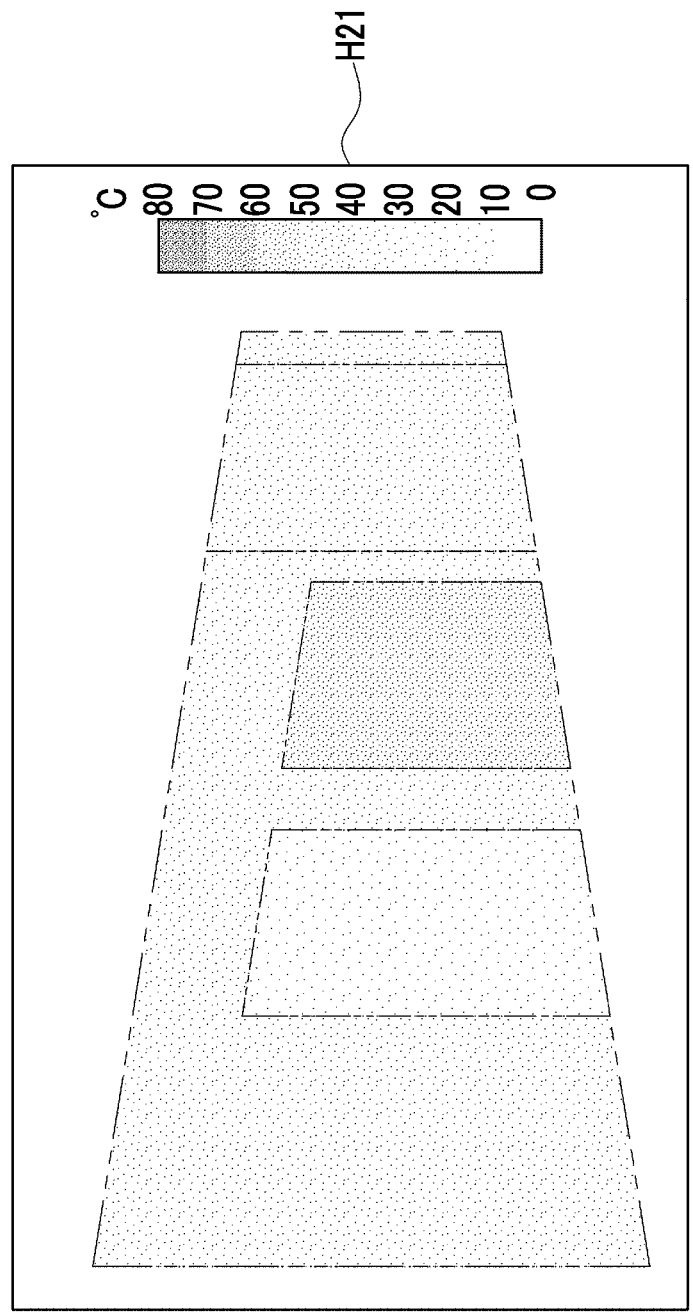
FIG. 19 is a diagram showing a temperature information image in another aspect.

As in the above-described example of the first embodiment, the temperature information conversion unit 17 converts the pixel value of the corrected first image G21 to temperature information to acquire a temperature distribution image H21 shown in FIG. 19. Like the temperature distribution image H11, the temperature distribution image H21 displays an image based on the pixel value according to the temperature and a gauge indicating the relationship between the temperature and the pixel value after conversion in parallel. It is possible to detect, from the temperature distribution image H21, the arrangement of the cooler C and the heater D on a side opposite to the imaging side with respect to the subject B and the positions where the cooler C and the heater D are arranged.

A method of acquiring the corrected first image G21 using the infrared image acquisition device 10 will be described focusing on parts different from the above-described example of the first embodiment.

Figure 20:
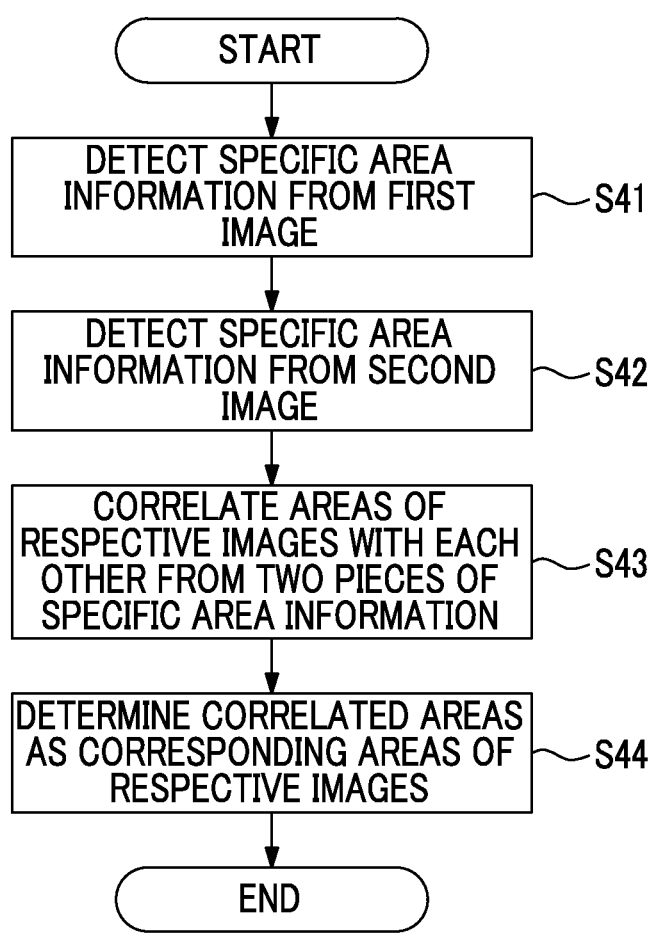
FIG. 20 is a flowchart for detecting corresponding areas in another aspect.
Figure 21:
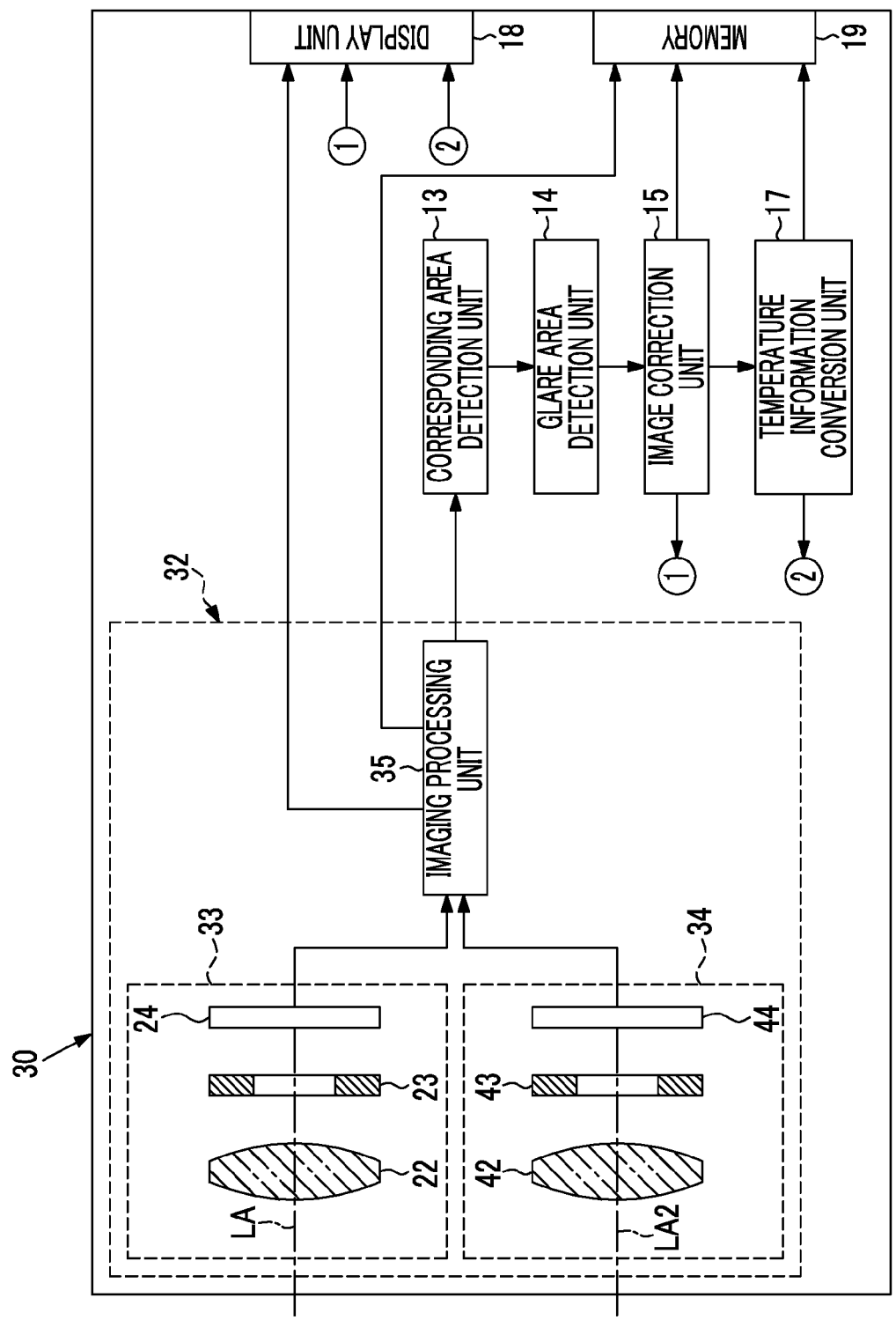
FIG. 21 is a block diagram showing the configuration of an infrared image acquisition device of a second embodiment.

A corresponding area detection step S13 different from the above-described example will be described referring to the flowchart shown in FIG. 20. The corresponding area detection step S13 has Steps S41 to S44. The corresponding area detection unit 13 receives the supply of the first image F21 and the second image F22 from the imaging processing unit 25 of the infrared imaging unit 12. The corresponding area detection unit 13 detects the specific areas M1 to M6 in the first image F21 (Step S41). Next, the corresponding area detection unit 13 detects the specific areas M1 to M6 in the second image F22 (Step S42).

The corresponding area detection unit 13 correlates an area inside the specific areas M1 to M6 in the first image F21 with an area inside the specific areas M1 to M6 in the second image F22 (Step S43). The respective areas correlated between the respective images are respectively detected as the first corresponding area R21 and the second corresponding area R22 (Step S44).

An image correction step S15 different from the above-described example will be described below. The image correction unit 15 calculates the difference between the amount of infrared rays of the first glare area RX21 in the first image F21 and the amount of infrared rays of the second glare area RX22 in the second image F22. The image correction unit 15 calculates the amount T1 of glare from the calculated difference. The image correction unit 15 subtracts the amount T1 of glare from the amount of infrared rays in the first glare area RX21. The image correction unit 15 reflects (takes into consideration) the subtraction processing in the first corresponding area R21 of the first image F21 to correct the glare. With this, the image correction unit 15 acquires the corrected first image G21.

As described above, since the infrared image acquisition device 10 corrects the glare using the images captured at different angles with respect to the area BR of the subject B under the same conditions, it is possible to acquire the corrected first image G21 which is an infrared image suitable for calculating the temperature of the subject B. The temperature distribution image H21 is obtained from the corrected first image G21 by the temperature information conversion unit 17.

In this example, the first image F21 and the second image F22 may be replaced and the processing based on the same steps may be performed. In this case, the second image F22 is corrected.

The infrared image acquisition device 10 can acquire temperature information of the pillar Q from the amount T1 of glare of the pillar Q glaring on the first image F21 and the infrared reflectance of the subject B. The temperature information of the pillar P can also be acquired from the amount T2 of glare of the pillar P glaring on the second image F22 and the infrared reflectance of the subject B.

In the first embodiment, although the detection of the corresponding areas is performed based on the contour information as in the first example or based on the specific areas as in another example, the corresponding areas may be detected using a method, such as block matching or pattern matching. In block matching, one image of the first image and the second image is divided into small areas (blocks) having a given size, and which part of the other image each small area of one image corresponds to is searched. In a case where the total sum of brightness differences or the sum of the squares of the brightness differences between the respective small areas of one image and the respective small areas of the other image takes a minimum value, a case where a normalized cross-correlation gives a maximum value is searched, and the correlation of the respective small areas is performed. In pattern matching, an area having the same pattern as an image prepared in advance is searched, and the correlation of one image and the other image is performed.

[Second Embodiment]

In the first embodiment, although the first image and the second image are captured using the infrared imaging unit 12 having one infrared sensor, an infrared imaging unit having two infrared sensors may be used to capture the first image and the second image with the respective infrared sensors.

An infrared image acquisition device 30 of the second embodiment comprises an infrared imaging unit 32 instead of the infrared imaging unit 12 of the first embodiment. The infrared imaging unit 32 comprises a first infrared imager 33, a second infrared imager 34, and an imaging processing unit 35.

The first infrared imager 33 comprises a focus lens 22, a diaphragm 23, and an infrared sensor 24 the same as those in the first embodiment, and captures a first image. The second infrared imager 34 has the same configuration as the first infrared imager 33, comprises a focus lens 42, a diaphragm 43, and an infrared sensor 44, and captures a second image. The imaging processing unit 35 generates an infrared image using an imaging signal from the infrared sensor 44, in addition to the imaging signal from the infrared sensor 24. Other configurations in the second embodiment are the same as those in the first embodiment, and thus, detailed description will not be repeated.

In the second embodiment, it is preferable that the first image acquisition step S11 and the second image acquisition step S12 are simultaneously performed using the first infrared imager 33 and the second infrared imager 34 respectively. In this case, the amount of infrared rays does not change over time between the first image and the second image.

In the foregoing embodiments, although the infrared camera has been described as an example, the invention can be applied to a smartphone or the like.

EXPLANATION OF REFERENCES 10, 30: infrared image acquisition device
12, 32: infrared imaging unit
13: corresponding area detection unit
14: glare area detection unit
15: image correction unit
17: temperature information conversion unit
18: display unit
19: memory
F11, F21: first image
F12, F22: second image
R11, R21: first corresponding area
R12, R22: second corresponding area
RX11, RX21: first glare area
RX12, RX22: second glare area
G11, G21: first image after correction
H11, H21: temperature distribution image

What is claimed is:

1. An infrared image acquisition device comprising:
   an infrared imaging unit which acquires a first image and a second image having different imaging directions with respect to a subject;
   a corresponding area detection unit which detects areas corresponding to the subject in the first image and the second image as corresponding areas;
   a glare area detection unit which compares the first image and the second image in the corresponding areas and detects, as a glare area, an area where the first image has a larger amount of infrared rays than that of the second image; and
   an image correction unit which corrects the glare area in the first image based on a glare area in the second image.

2. The infrared image acquisition device according to claim 1,
   wherein the infrared imaging unit captures the first image and the second image under the same imaging exposure conditions.

3. The infrared image acquisition device according to claim 1,
   wherein the image correction unit substitutes the glare area in the first image with the glare area in the second image to correct the first image.

4. The infrared image acquisition device according to claim 1,
   wherein the image correction unit calculates the amount of glare in the glare area from the difference in the amount of infrared rays between the first image and the second image and subtracts the amount of glare from the glare area in the first image to correct the first image.

5. The infrared image acquisition device according to claim 1,
   wherein the corresponding area detection unit detects the corresponding areas based on contour information of the first image and the second image.

6. The infrared image acquisition device according to claim 1,
   wherein the corresponding area detection unit detects the corresponding areas based on specific areas detected in common from the first image and the second image.

7. The infrared image acquisition device according to claim 1,
   wherein the infrared imaging unit is able to detect an infrared ray in a wavelength range equal to or greater than 8 μm and equal to or less than 14 μm.

8. The infrared image acquisition device according to claim 1,
   wherein the infrared imaging unit comprises a first infrared imager which captures the first image, and a second infrared imager which captures the second image.

9. The infrared image acquisition device according to claim 1, further comprising:
   a display unit which converts the pixel value of the first image corrected by the image correction unit to temperature information and displays the temperature information.

10. An infrared image acquisition method comprising:
    a first image acquisition step of acquiring a first image of a subject using an infrared imaging unit;
    a second image acquisition step of acquiring a second image having a different imaging direction from the first image with respect to the subject using the infrared imaging unit;
    a corresponding area detection step of detecting areas corresponding to the subject in the first image and the second image as corresponding areas;
    a glare area detection step of comparing the first image and the second image in the corresponding areas and detecting, as a glare area, an area where the first image has a larger amount of infrared rays than that of the second image; and
    an image correction step of correcting the glare area in the first image based on a glare area in the second image.

11. The infrared image acquisition method according to claim 10,
    wherein the infrared imaging unit comprises a first infrared imager and a second infrared imager, and
    the first image acquisition step and the second image acquisition step are performed simultaneously using the first infrared imager and the second infrared imager respectively.

* * * * *